May 21, 1963

J. R. WOOD ET AL 3,090,220

FILE SHARPNESS TESTER

Filed Oct. 19, 1959

INVENTORS
JAMES R. WOOD
BY HARRY L. BOGGS
Bulwinkle Mattingly & Huntley
Attorneys

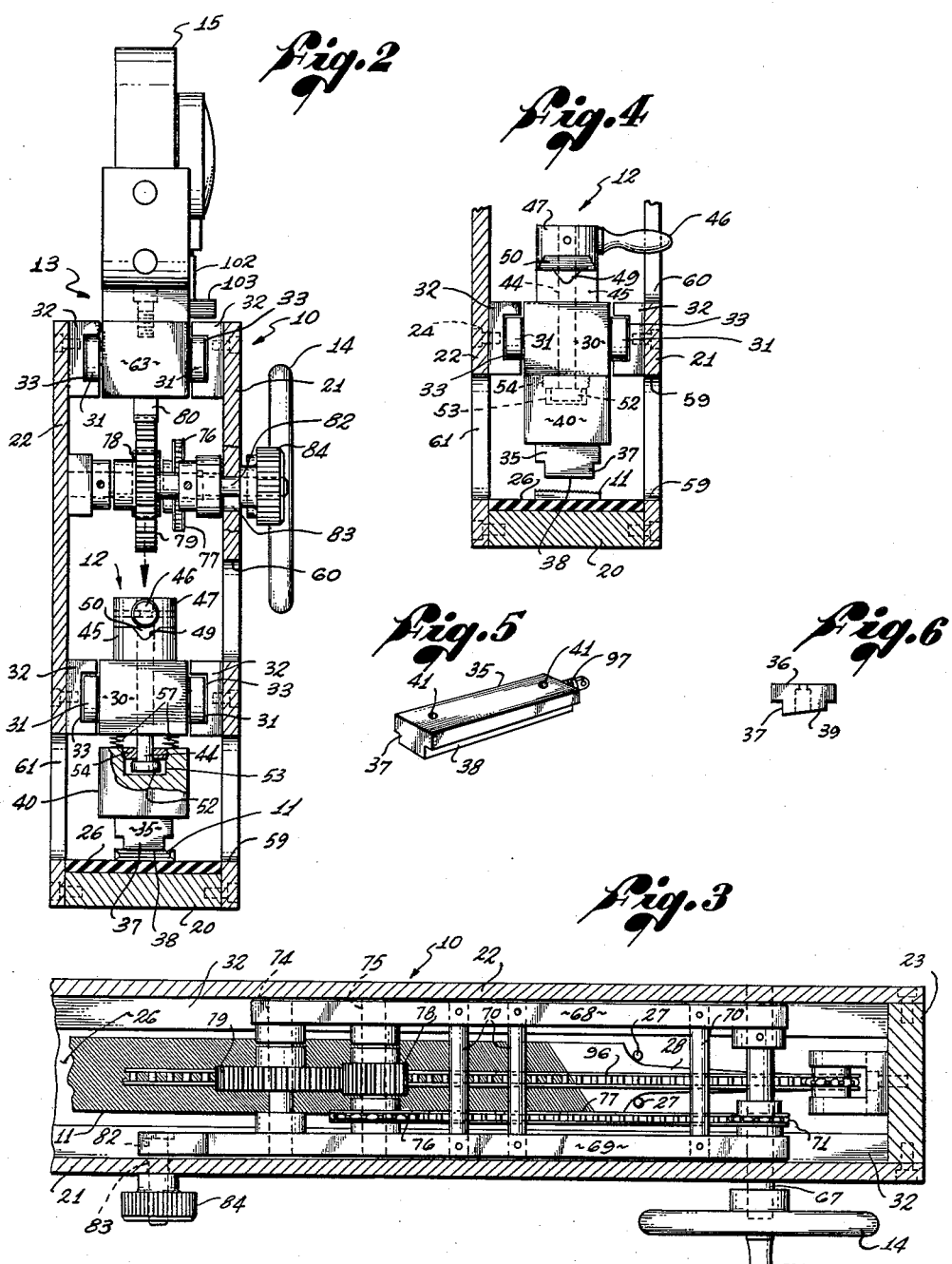

United States Patent Office 3,090,220
Patented May 21, 1963

3,090,220
FILE SHARPNESS TESTER
James R. Wood, Los Angeles, and Harry L. Boggs, Downey, Calif., assignors to Western Tool and Engineering Company, Los Angeles, Calif., a partnership
Filed Oct. 19, 1959, Ser. No. 847,318
9 Claims. (Cl. 73—9)

The present application relates to an apparatus for testing the sharpness of files.

In general, purchasers of files do not commonly attempt to make comparisons of competing files as to cutting effectiveness, assuming that all files are substantially equivalent in this respect. Purchases of files are accordingly primarily based on such factors as price and the reputation of the maker because there are no data available to the purchasing public accurately reflecting the relative cutting efficiencies of several makes of files under consideration by the purchaser. While some purchasers have attempted to make comparisons of new files, or new files as compared to resharpened files, on the basis of manual tests by a skilled bench hand, such tests have been demonstrably unreliable when checked for validity under controlled test conditions.

The present invention contemplates a reliable and portable, yet relatively inexpensive apparatus for testing the relative sharpness of different brands of resharpened and new files, or new files as compared to resharpened files. With our apparatus random samples of competing files can be subjected to identical test conditions and the test results for the competing files compared. In general, the apparatus includes a means for stationarily supporting a file with one cutting face thereof exposed to a test block. This test block is mounted in the apparatus to exert a constant force perpendicular to the file face. A pulling means is provided to draw the test block over the length of the file face, and the test block is further mounted for movement along the apparatus in such a manner as to take into consideration any longitudinal convexity of the file face, which may be present. A sensing element is interposed in the test block pulling means and the magnitude of response of this sensing element is proportional to the cutting efficiency of the file under consideration. The extent of this response by the sensing element is quantitatively indicated by a gage operatively associated with the sensing element.

An object of our invention is to provide a file sharpness testing apparatus to accurately measure the cutting effectiveness of a file in quantitative terms.

Another object of the invention is to provide a file sharpness tester for subjecting different files to uniform and controlled test conditions.

Yet another object of the invention is to provide a file sharpness testing apparatus adapted to present a direct quantitative reading reflecting the sharpness of a file being tested.

It is also an object of the invention to provide a testing apparatus of this character in which a variety of test blocks may be employed for the testing of files of different classes.

A further object of this invention is to provide an apparatus for testing the sharpness of files in which a testing block can be mounted for being drawn over the length of a file without having any substantial variation in the force perpendicular to the file face arising due to any longitudinal convexity which may be present in the file face.

A still further object of the invention is to provide a simplified and portable testing apparatus of this character in which the test conditions cannot be significantly varied by the intervention of any human element in the operation of the device, whereby the validity of the test results is unimpeachable.

These and other objects and advantages of the invention will be apparent from the following description of a presently preferred embodiment thereof when taken in conjunction with the annexed drawings wherein:

FIGURE 2 is a vertical sectional view taken along the line 2—2 of FIGURE 1;

FIGURE 3 is a partial horizontal sectional view taken along the line 3—3 of FIGURE 1;

FIGURE 4 is a partial vertical sectional view similar to FIGURE 2 but showing the test block supporting mechanism in a raised position to permit placement or removal of a file within the apparatus;

FIGURE 5 is a perspective view of a test block for use in testing files having a substantially flat face; and FIGURE 6 is an end view of another form of test block employed for testing knife files or the like.

Figure 1:
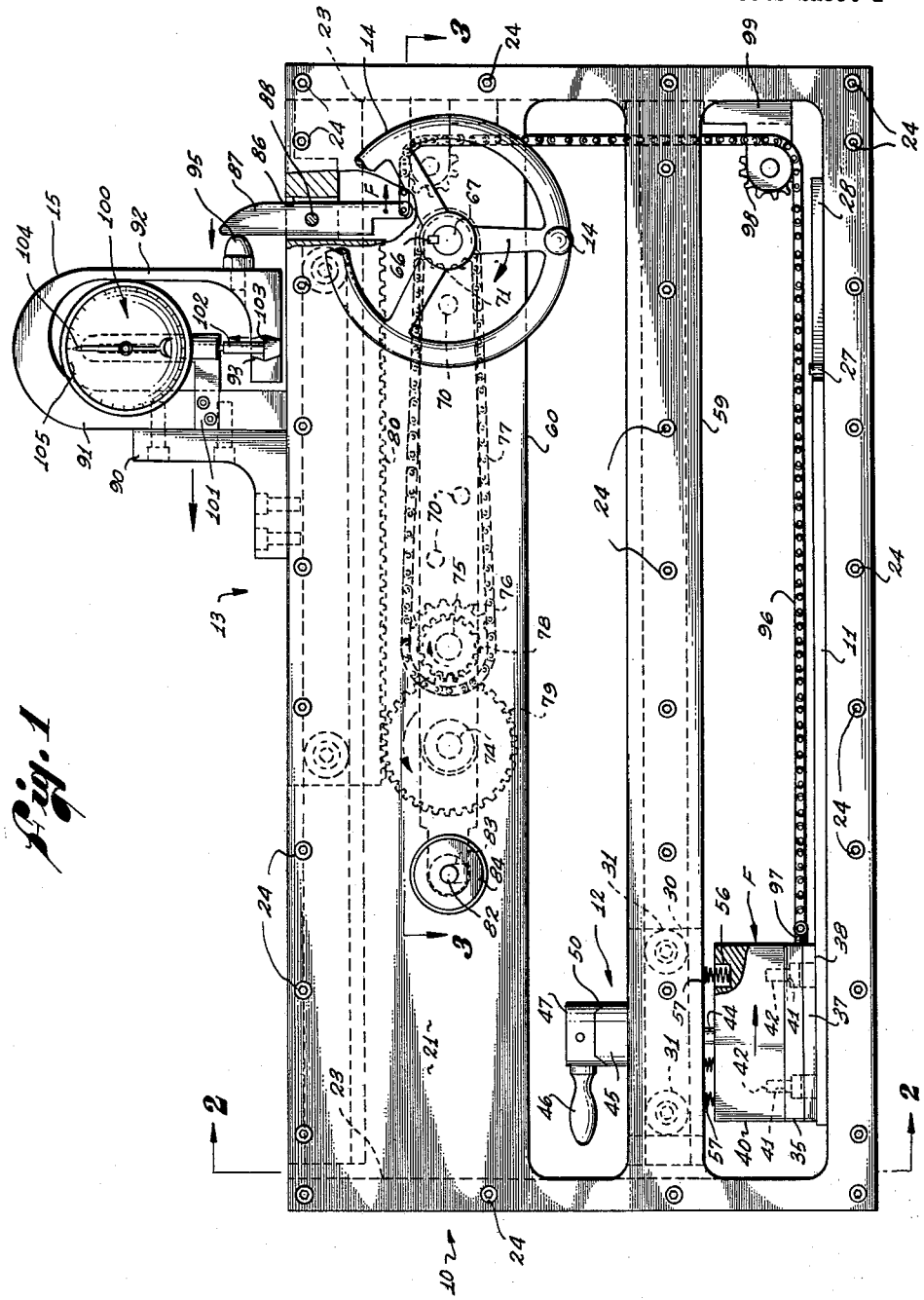
FIGURE 1 is a side elevational view of our file sharpness testing apparatus, with portions thereof being cut away to show interior details of construction.

In general, the presently preferred embodiment of our invention includes a rigid box frame 10 along the base of which a file 11 to be tested can be supported and held against displacement while the test is being conducted. A test block support mechanism 12 is mounted in the frame 10 for selective movement between raised and lowered positions and in the lowered position holds a test block against the exposed cutting face of the file with force directed normally to the file face. A pulling carriage 13 is mounted on ways in the top of the frame 10 and has a positive driving connection with an actuating handle 14 whereby actuation of the handle is translated into movement of the carriage 13 along its ways. The sensing element takes the form of a resiliently deformable member 15 carried by the carriage 13 and the member and carriage are drivingly connected to the test block support 12.

More specifically, the box-like frame 10 consists of a rectangular base 20, a pair of opposite side plates 21 and 22 and a pair of end plates 23, all of these parts being held in rigidly assembled relationship by suitable fasteners 24.

The base plate 20 is covered with a pad 26 which is preferably made of hard rubber. The file 11 is placed on this pad and the pad serves to protect the teeth of the lower cutting face against damage while the file is undergoing a test. In order to support the file 11 against longitudinal displacement while being tested, the base plate 20 at one end has an abutment means comprising a pair of studs 27 affixed to the base plate and protruding upwardly above the top surface of the pad 26. As is shown in FIGURE 3, the file 11 is placed in position by inserting its tang 28 between the studs 27 and the tang is pushed between the studs until the shoulders defined by the junction of the tang 28 with the heel of the file 11 abut the studs 27.

The test block mechanism 12 includes a block-shaped body 30 that has a pair of rollers 31 mounted on each side thereof. The side plates 21 and 22 rigidly support a pair of longitudinally extending channel-shaped guides 32 which are formed with confronting ways 33. The body 30 has a sliding fit between the confronting faces of the guide members 32 and the rollers 31 are adapted for reception within the ways 33 and have rolling engagement with either the lower or upper faces of the ways, restraining the body 30 against vertical displacement.

The file 11 has been illustrated as a mill file which can be tested by means of the test block 35 shown in FIGURE 5. However, it will be appreciated that by the use of an appropriately configured test block other types of files can also be tested. For example, FIGURE 6 illustrates a suitable cross-sectional configuration for a test block 36 which can be used in testing a knife file. Both of these test blocks are generally T-shaped in cross-sectional configuration, having a stem portion 37 which is preferably narrower than the face of the file to be tested. The test block 35 has a downwardly exposed flat horizontal face 38 suitable for testing flat files, pillar files, mill files and the like, while the test block 36 has a laterally tapered downwardly exposed face 39 which can be supported in a position parallel to the tapered face of a knife file in the test block mechanism 12. These test blocks are made of iron, bronze or other material that duplicates or approximates the nature of the work pieces on which the files under consideration are to be used.

The test block mechanism 12 has a support 40 for interchangeably supporting a selected one of a variety of test blocks. The support 40 comprises a rectangular block-like member and each test block, as for example the test block 35, is formed with a pair of counterbores 41 through which a pair of suitable fasteners 42 can be passed for threaded engagement with a pair of tapped bores opening in the lower face of the support 40. The counterbores 41 are relatively deep so that the heads of the fasteners 42 are seated well above the exposed face 38 of the test block 35 in order to avoid the possibility of subjecting the fastener heads to the action of the file 11.

The support 40, with the test block 35 fastened thereto, is mounted on the body 30 by means of a vertically extending shaft 44. This shaft is journaled within the body 30 and through a cylindrical boss 45 which surmounts the body. A handle 46 is affixed to the upper end of the vertically extending shaft 44 and this handle has a hub 47 having a cam engagement with the upper face of the boss 45, this cam means comprising a diametrically extending V-shaped slot 49 on the upper face of the boss 45 adapted to receive a complementarily configured V-rib 50 extending diametrically across the lower face of the hub 47.

As is shown in FIGURE 2, the lower end of the shaft 44 mounts a radially outwardly extending disc 52 that is axially movable within a blind bore 53 formed in the upper face of the support 40. This bore is tapped at its upper end to threadedly mount a bearing 54 that coaxially slidably supports the shaft 44. A lost motion connection is thus provided between the shaft 44 and support 40, allowing limited axial movement of the shaft without imparting concurrent or co-movement to the support.

Referring now to FIGURE 1, it will be noted that a plurality of spring pockets 56 are formed in the upper face of the support 40. The lower face of the body 30 is similarly formed with a like plurality of spring pockets (not shown) and a plurality of coil springs 57 are disposed within the aligned pairs of spring pockets.

When the test block mechanism is in the position shown in FIGURE 4, the test block 35 is raised out of the way to permit placement and removal of a file on the pad 26. When the handle 46 is moved to this position, the rotation of the hub 47 causes the V-rib 50 to ride up and out of the V-slot 49 of the boss 45. The shaft 44 is thus caused to move upwardly in the blind bore 53 of the support 40 until the disc 52 engages the underside of the bearing 54, so that when the handle 46 is finally in the position shown in FIGURE 4, the disc 52 will have lifted the support 40 completely out of engagement with the file 11. Upon such lifting of the support 40, the springs 57 will be further compressed in the aligned spring pockets of the support 40 and body 30.

When the handle 46 is returned to the position illustrated in FIGURE 2, the bottom face 38 of the test block 35 will be held against the cutting face of the file 11 only by the force of the springs 57. The rollers 31 of the body 30 are then biased into rolling engagement with the uppermost or downwardly facing surfaces of the guide ways 33.

It will be observed that in the fully lowered position of the shaft 44, there is a clearance space within the bore 53 of the support 40 both above and below the upper and lower faces of the disc 52, whereby the force perpendicular to the cutting face of the file comprises the force exerted by the springs 57.

Mill files, as well as many other types of files, are commonly formed with cutting faces which are longitudinally convex, i.e. the thickness of the file may be varied from the tip to the heel oppositely outwardly from the midpoint of the cutting face. This slight longitudinal convexity of the cutting faces of the file 11 is illustrated in FIGURE 2. Accordingly, when the test block 35 is drawn over the cutting face of the file 11, its lower face 38 will describe a slightly arcuate locus corresponding to the longitudinal convexity of the file's cutting face.

The springs 57 are chosen to have a substantially linear excursion throughout the range in which they are called upon to act as the test block 35 is being drawn over the file's cutting face. Accordingly, due to the slightness of the convexity, the total spring force imposed on the test block will be substantially constant throughout the movement of the test block over all files of substantially the same thickness. At the same time this spring force will depress the lower face of the file 11 into the rubber pad 26. The file 11 is thereby more firmly held against displacement and any vibration occurring during the test is dampened by the pad 26 and springs 57 and the file is also supported against undue rocking movement due to the convexity of its lower face.

The present apparatus employs a total of six of the springs 57. Referring to FIGURE 1, it will be seen that four of these springs are placed behind the shaft 44 in pairs arranged on opposite sides of the longitudinal centerline of the support 40, while a pair of the springs 57 are arranged at the front end of the support 40. Accordingly, there is greater spring force exerted on the rear end of the test block 35 than on its forward end, and this arrangement avoids tipping of the test block 35 and its support 40 upon acceleration of these parts. Inasmuch as the body 30 is supported by the rollers 31 within the ways 33, practically all of the frictional resistance to drawing the test block 35 over the file 11 is due to the frictional resistance of the test block on the file, rather than friction of the test block support mechanism.

In order to permit placement and removal of a file on the pad 26, the side plate 21 is formed with a longitudinally extending horizontally disposed slot 59, having a vertical dimension corresponding to the space between the pad 26 and the guide members 32. This slot also serves as a viewing aperture to permit observation during a testing operation. Another horizontally extending slot 60 is also formed in the side plate 21 just above the guide member 32 whereby convenient access may be had to the handle 46 at both ends of the travel of the test block mechanism 12. In order to permit observation of a test from either side of the apparatus, the other side plate 22 is also formed with a slot 61 in alignment with the slot 59 of the other side plate.

The pulling carriage 13 includes a block-like body 63 that has a plurality of the rollers 31 mounted on its opposite sides. Another pair of the channel guides 32 are mounted along the upper edges of the side plates 22 and 21 to extend horizontally therealong and the rollers of the body 63 are received within the ways 33 of the guides 32. The body 63 of the pulling carriage, like the body 40 of the test block mechanism 12, is adapted to be slidably received between the opposed faces of the pair of channels 32.

In the illustrated apparatus the pulling carriage 13 is manually actuated through a sprocket chain drive mechanism. However, it will be appreciated that a power means can be provided and other driving connections than sprocket chain means can be employed.

The crank 14 is keyed, as at 66, to a protruding end of a shaft 67 which is journaled in both of the side plates 21 and 22. Between the side plates 21 and 22 a parallel pair of bars 68 and 69 are journaled at one end on the shaft 67 and these bars are rigidly interconnected for co-movement pivotally on the shaft 67 by a plurality of cross rods 70 extending therebetween. A sprocket 71 is also keyed to the shaft 67 just inside of the longer bar 69 and is driven by rotation of the crank 14.

At the other ends of the bars 68 and 69 from the drive shaft 67, a parallel pair of shafts 74 and 75 are journaled at opposite ends within the pair of bars. The shaft 75 has another sprocket 76 keyed thereto and drivingly engaged, by means of an endless chain 77, with the drive sprocket 71 of the shaft 67. The shaft 75 also drivingly mounts a pinion 78 in engagement with a gear 79 on the other shaft 74. The carriage body 63 on its underside is formed with an integral rack 80 extending along its longitudinal centerline and drivably engageable by the gear 79. Thus, when the parts of the apparatus are in the positions shown in FIGURE 1, actuation of the crank 14 in a clockwise direction ultimately drives the pulling carriage 13 towards the left.

This driving mechanism is selectively disengageable from the pulling carriage 13 in order to permit return of the carriage to its starting position shown in FIGURE 1. For this purpose the longer arm 69 at its free end mounts a stud 82 that extends outwardly through a generally vertically extending slot 83 formed in the confronting portion of the side plate 21. The protruding end of the stud 82 is threaded for engagement with a knurled locking knob 84 which can be loosened to permit raising and lowering of the drive mechanism. For driving engagement of the gear 79 and rack 80, the mechanism is raised, after the carriage 13 has been returned to its starting position, and the carriage or the crank 14 then moved slightly to insure meshing engagement of the teeth of the gear 79 and rack 80. The knob 84 is then snubbed up against the outer face of the side plate 21.

The carriage body 63 at one end is formed with a slot 86 that extends vertically therethrough. A lever 87 is mounted vertically in the slot 86 and has a pivotal axis on a pin 88 that extends horizontally through the slot 86 and is mounted at its opposite ends in the body 63.

On its upper face the carriage body 63 has affixed thereto a generally L-shaped bracket 90, to which the sensing member 15 is in turn fastened. This member takes the form of a spring of loop or horseshoe configuration which has a rigid relatively thick vertically extending leg 91 secured to the upright leg of the bracket 90. At its upper end this thick leg of spring member 15 develops into a reversely turned apex which gradually tapers into a relatively thin leg 92 extending downwardly parallel to the leg 91. At its lower end the thin leg 92 develops into a horizontally extending relatively thick arm 93 that points back towards the thick leg 91. It will be observed that this configuration is adapted to provide a flexural or pivot axis in the leg 92 at some point along the vertical dimension thereof. It is also to be noted that the end of the arm 93 is normally spaced apart from the confronting face of the thick leg 91.

The resiliently deformable thin leg 92 of the spring member 15 mounts a button 95 on its face confronting the upper end of the lever 87. At its lower end, the lever 87 is drivingly connected to a pull chain 96. At its other end the chain 96 is connected to a stud 97 fastened to the center of the front face of the test block 35 and between the stud 97 and the lower end of the lever 87, the chain 96 is trained around a pair of idler sprockets 98, both of which are supported in brackets 99, fastened to an end wall 23 of the frame 10. When the drive or pull chain 96 is tensioned, its lower flight is parallel to the supporting surface for the file, between the lower sprocket 98 and the stud 97, and along the longitudinal center line of this surface.

With the arrangement just described when a pulling force is imparted to the carriage 13 by actuation of the crank 14, this force is transmitted first to the pin 88 which mounts the lever 87. When the test block 35 is in engagement with the file 11, as illustrated in FIGURE 1, the frictional resistance opposing movement of the carriage 13 is represented by the letter F at the lower end of the lever 87. This lever thus tends to pivot on its pin 88 in counterclockwise direction, and a deforming force is thus exerted on the thin leg 92 of the spring member 15. The thin leg 92 is deformed in proportion to the resistance F, and a couple is thus effected at the opposite ends of the lever 87 about the axis of the pin 88. When the resistance F is overcome, the carriage 13 is thereafter caused to be moved along its ways by the driving force exerted on crank 14.

In order to provide a quantitative measurement of the force F, a force gauge 100 is mounted on the member 15. This force gauge is of a commercially available type and is mounted on the rigid leg 91 of the member 15 by an L-shaped bracket 101. The gauge 100 has a downwardly pointing plunger 102 having a flat lower end face which rests on a horizontal face 103 of a member which projects sidewardly from the arm 93. Upon deflection of the thin leg 92 of the member 15, axial displacement of the plunger 102 occurs to actuate a pointer 104 of the gauge which sweeps over force graduations 105. It will be observed that the spacing between the end of the arm 93 and the thick leg 91 limits the possible displacement of the thin arm 92 in order to prevent any overloading of the gauge 100.

Before testing a file the carriage 13 is positioned in the right-hand end of its ways as viewed in FIGURE 1 and the test block support means 12 is positioned in the left-hand end of its ways, as viewed in the same figure. After a file 11 has been placed into position against the studs 27, the test block 35 is lowered into contact with the upwardly exposed cutting face of the file. The clutch knob 84 can then be grasped and the drive mechanism raised until the gear 79 drivingly meshes with the rack 80 on the underside of the carriage body 63.

The crank 14 is now actuated for driving the carriage 13 to the left along its ways and to concurrently pull the test block 35 from left to right across the cutting face of the file 11. Upon application of the pulling force, the resistance F, through the medium of the couple provided by the lever 87, causes a deformation of the spring member 15 whereupon a proportional indication is given by the pointer 104 with respect to one of the graduations 105. The initial reading of the gauge 100 may be perceptibly greater at the commencement of motion of the carriage 13 and the test block 35 due to the fact that the coefficient of static friction is higher than the coefficient of sliding friction but it will be found to be sufficient to make a record indication given by the pointer 104 after a substantially uniform velocity of the test block has been achieved. This indication can be very readily read inasmuch as the pointer 104 will be steady with respect to the graduations 105 after the test block 35 has been pulled into motion. The sprocket chain drive mechanism illustrated in the drawings has a high enough mechanical advantage to produce substantially constant speed of the carriage 13 once it has been accelerated.

When competing files are all subjected to testing in our apparatus, an indication on the gauge 100 may be recorded for each of them and the test results then compared. It will be appreciated that the sharper files will give a higher reading than those of lesser cutting efficiency due to the fact that the cutting teeth of a sharp file will be subjected to a greater unit stress than the larger area of relatively dull cutting teeth of some other file.

It will be apparent that various modifications and changes may be made with respect to the foregoing description but it is to be understood that we do not wish to be limited to the precise details of construction hereinabove set forth, but only by the spirit and scope of the following claims.

We claim:

1. A test apparatus comprising: a rigid frame having a surface to support a test specimen; guide means paralleling said surface; a test block support mounted on said guide means for movement paralleling said surface; a test block mounted on said support having a face selectively movable into contact with a specimen; a means on said test block and support to hold said test block face against a specimen with a predetermined force that is greater on the rear end of said block than on the front end of said block; a carriage movably mounted on said frame; an actuating means on said frame drivingly engaged with said carriage to move said carriage along said frame; a means drivingly connecting said carriage and test block to move said block in response to movement of said carriage; means on said frame to hold a specimen against movement in response to movement thereon of said test block; and strain gauge means, connected to said means for drivingly connecting said carriage and test block, to indicate the extent of strain occurring in said means for drivingly connecting said carriage and test block when said test block is moved along a specimen at a substantially uniform velocity in response to actuation of said carriage.

2. A test apparatus comprising: a rigid frame having a surface to support a file thereon; a test block support mounted on said frame for movement over and along the length of said surface; a test block; resilient means mounting said test block on said support to bias said test block against a file on said surface with a predetermined force; actuating means for pulling said test block over a file on said surface and including a spring means interposed between said test block and the point of application of a pulling force to said actuating means; a means to hold a file against movement on said surface when said test block is being pulled thereacross; and a means to measure the reaction of said spring means induced by pulling said test block over said file.

3. A file testing apparatus comprising: a rigid frame having a horizontal surface to support a file thereon; a test block support mounted on said frame for horizontal movement over and along the length of said surface; a test block; resilient means mounting said test block on said support to bias said test block against a file on said surface with a predetermined force; a carriage mounted on said frame for movement therealong; a resiliently deformable member affixed to said carriage; a means interconnecting said test block and deformable member to pull said test block over a file in response to movement of said carriage; means to hold a file against movement in response to movement of said test block; and a gauge means on said carriage to measure the extent of deformation of said member during pulling of said test block over a file.

4. A file testing apparatus comprising: a rigid frame having a horizontal surface to support a file thereon: a test block support mounted on said frame for horizontal movement over and along the length of said surface; a test block; resilient means mounting said test block on said support to bias said test block against a file on said surface with a predetermined force; a carriage mounted on said frame for movement therealong; a resiliently deformable member affixed to said carriage; a lever pivotally mounted on said carriage and having engagement at one end with with deformable member; an elongated pulling element connected at one end to said test block and at its other end to the other end of said lever, said lever being arranged to deform said member when said element is tensioned in response to movement of said carriage, said test block being pulled along a file on said surface when said pulling element is actuated; a means to hold a file against movement along said surface when said test block is moved along said file; and a gauge means on said carriage to measure the extent of deformation of said member during pulling of said test block over a file.

5. A file testing apparatus comprising: a rigid frame having a horizontal surface to support a file thereon; a test block support mounted on said frame for horizontal movement over and along the length of said surface; a test block; resilient means mounting said test block on said support to bias said test block against a file on said surface with a predetermined force; a carriage mounted on said frame for movement therealong; a member rigidly affixed to said carriage having a resilient leg; a lever pivotally mounted on said carriage and having engagement at one end with the free end of said resilient leg; an elongated pulling element connected at one end to said test block and at its other end to the other end of said lever, said lever being arranged to deform said leg when said element is tensioned in response to movement of said carriage, said test block being pulled over a file on said surface when said pulling element is actuated; a means to hold a file against displacement when said test block is moved thereover; and a gauge on said carriage having an actuating plunger whose free end abuts a confronting face on the free end of said resilient leg that is adapted to depress said plunger when said leg is deformed.

6. A file testing apparatus comprising: a rigid frame having a surface to support a file; an abutment means at one end of said surface to unidirectionally prevent displacement of a file on said surface; a test block support mounted on said frame for movement over and along the length of said surface; a test block; a lost motion means interconnecting said test block and support for raising and lowering said test block; resilient means between said test block and support to bias said test block against a file on said surface with a predetermined force, such biasing action occurring within the limits of lost motion of said lost motion means; actuating means for pulling said test block over a file on said surface at a substantially uniform velocity including a spring means interposed between said test block and the point of application of a pulling force to said actuating means; and a means to measure the reaction of said spring means induced by pulling said test block over a file.

7. An apparatus as set forth in claim 6 in which said actuating means comprises: a carriage mounted on said frame for movement therealong and on which said spring means is mounted, a lever pivotally mounted on said carriage and having engagement at one end with said spring means, and an elongated pulling element connected at one end to said test block and at its other end to the other end of said lever, said lever being arranged to deform said spring means when said element is tensioned in response to movement of said carriage.

8. An apparatus as set forth in claim 7 in which said frame mounts a drive gear selectively engageable and disengageable with a rack on said carriage, said drive gear being actuable through a reduction gear means.

9. A file testing apparatus comprising: a rigid frame having a horizontal surface in the bottom thereof that is padded with a layer of elastomeric material to support a file; a pair of studs affixed at one end of said surface and protruding upwardly through said layer of elastomeric material and oppositely spaced on opposite sides of the longitudinal center line of said horizontal surface whereby a tang of a file can be inserted between said studs and a file unidirectionally held against longitudinal displacement along said horizontal surface by abutment of the heel of said file with said studs; a test block support mechanism comprising a body having roller bearing support on opposite sides thereof in confronting horizontal ways in the inner surfaces of confronting side walls of said frame, said body being reciprocably movable through said ways parallel to said file supporting surface; a shaft vertically slidably mounted in said support mechanism body and having a hub portion on its upper end on top of a cylindrical boss affixed to the upper surface of said body, said hub and boss having cam engagement means to translate angular movement of said shaft into reciprocation of said shaft; a test block support on the lower end of said shaft and having a lost motion connection with said shaft, said test block support being vertically adjustable towards and away from said file supporting surface in response to angular actuation of said shaft; a test block removably mounted on the lower face of said test block support and in alignment with said file supporting surface; a plurality of pairs of springs interposed between the lower face of said support mechanism body and the upper face of said test block support, each of said springs being retained at opposite ends thereof in confronting spring pockets formed in said body and in said support, there being a greater number of said springs at one end of said test block than at the other end of said test block; a carriage in the upper portion of said frame having roller bearing engagement along opposite sides thereof with confronting horizontally extending ways on the confronting inner surfaces of the opposite side walls of said frame, a member rigidly affixed on top of said carriage and having a resilient vertically extending leg whose free end is disposed adjacent the upper surface of said carriage; a vertically extending lever pivotally mounted through a vertically extending slot formed through one end of said carriage, said lever at its upper end having engagement with a contact button fastened to the confronting surface of the lower free end of said resilient leg; a sprocket chain connected at one end to an end of said test block and at its other end to the lower end of said lever, said chain having idler sprocket support means within said frame, said lever being arranged to deform said resilient leg when said chain is tensioned in response to movement of said carriage in a direction opposite to resultant movement of said test block, said test block being pulled over a file on said surface when said chain is actuated; a gauge affixed to said carriage having a downwardly extending plunger whose free end abuts an upwardly facing confronting face on the free end of said resilient leg and adapted to depress said plunger when said leg is deformed; and a driver gear mounted in said frame that is selectively engageable and disengageable with a rack formed on the underside of said carriage, said driver gear being manually actuable by a crank through a reduction gear means that is drivingly engaged to said drive gear.

References Cited in the file of this patent
UNITED STATES PATENTS

| | | |
|---|---|---|
| 1,774,034 | Nielsen et al. | Aug. 26, 1930 |
| 1,841,167 | Weinberg | Jan. 12, 1932 |
| 1,902,594 | Thomas | Mar. 21, 1933 |
| 2,032,202 | Dennis | Feb. 25, 1936 |
| 2,441,993 | Dasher | May 25, 1948 |

OTHER REFERENCES

Publication: By Philip F. Kurz appearing in "American Journal of Physics," entitled "Useful Friction Recorder," vol. 24, #3, March 1956.